United States Patent [19]

Siciliano

[11] 3,757,741
[45] Sept. 11, 1973

[54] ADJUSTABLE CAGE FLOOR CONSTRUCTION

[75] Inventor: Anthony J. Siciliano, New York, N.Y.

[73] Assignee: Diamond International Corporation, New York, N.Y.

[22] Filed: Jan. 19, 1972

[21] Appl. No.: 218,866

[52] U.S. Cl. ................................................. 119/17
[51] Int. Cl. ........................................... A01k 31/00
[58] Field of Search ............... 119/17, 18, 48, 45 R, 119/51

[56] References Cited
UNITED STATES PATENTS

| | | | |
|---|---|---|---|
| 3,593,689 | 7/1971 | Van Huis | 119/48 |
| 3,338,214 | 8/1967 | Pockman | 119/48 |
| 3,319,606 | 5/1967 | Virgil | 119/51 |

Primary Examiner—Louis G. Mancene
Assistant Examiner—Gregory E. McNeill
Attorney—Karl W. Flocks

[57] ABSTRACT

An adjustable floor construction particularly adaptable for use in cage raising poultry, ranging in size from starters to growers to layers, said floor construction comprising a fixed section, a first adjustable section adjustably secured to said fixed section and a second adjustable section adjustably secured to said first adjustable section. The first adjustable section being selectively secured in either an upwardly inclined ramp position so that baby chicks of starter size may ascend thereon to avail themselves to feed or in a downwardly inclined ramp position upon which eggs of layer birds may freely gravitate to an egg receiving tray. The second adjustable section being capable of functioning both as part of a locking means and as said egg receiving tray.

11 Claims, 2 Drawing Figures

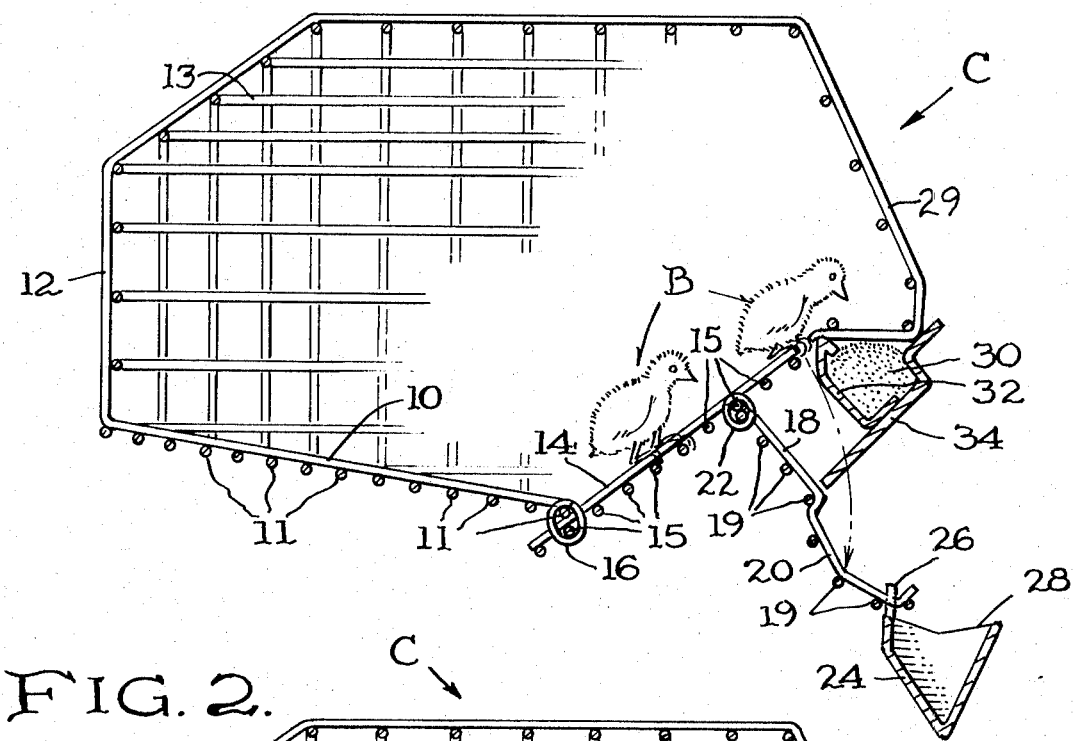
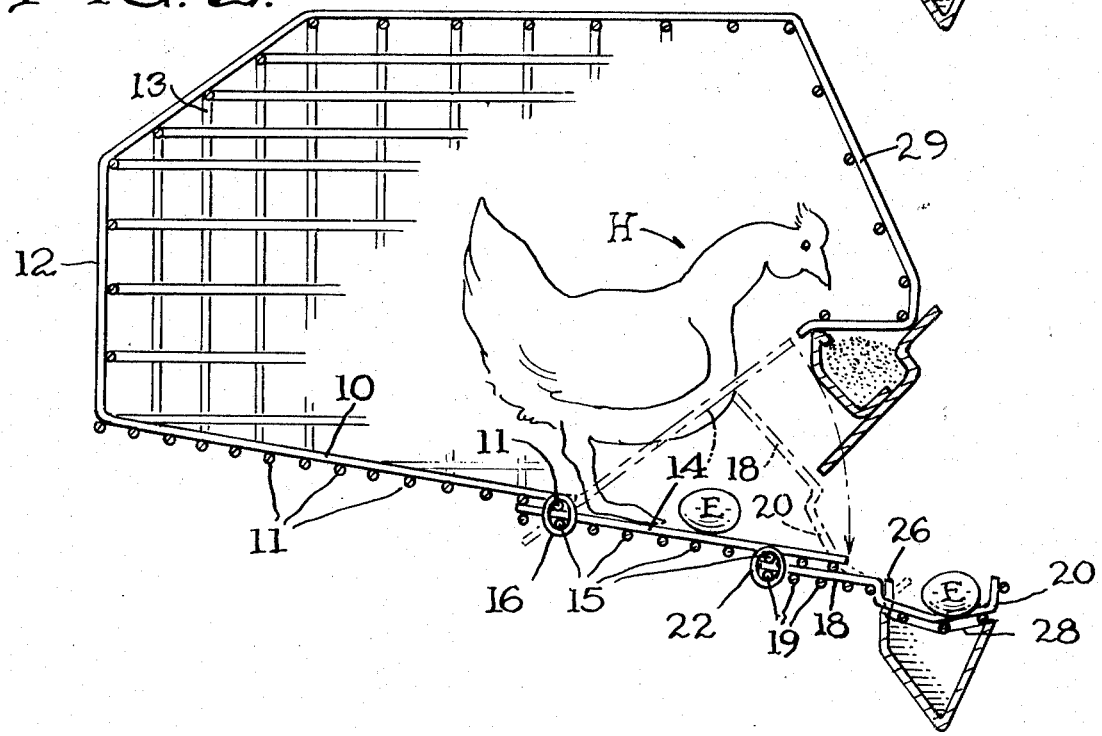

3,757,741

ADJUSTABLE CAGE FLOOR CONSTRUCTION

BACKGROUND OF THE INVENTION

1. Field of the Invention

The present invention relates to a floor construction for use in combination with a cage in which animals are confined, and in particular to a cage in which said floor construction may be selectively adjusted to accommodate animals of various sizes.

2. Description of the prior art.

Adjustable floor constructions although they are known in the prior art, relate to different problems than that sought to be solved by applicant. Exemplifying the prior art, for example, is U. S. Pat. No. 2,176,814 to Hawkins. In the Hawkins patent a floor member 64 is provided which may be adjusted to an inclined position to facilitate collection of eggs laid by the occupants of the cage or to a horizontal position for the comfort and rest of the occupants.

SUMMARY OF THE INVENTION

The present invention comprises a new and improved cage arrangement with versatility in accommodating occupants of a wide range in size. In accordance with the present invention a cage arrangement in which animals (in particular poultry) may be confined is provided with an adjustable floor construction which is selectively adjustable to accommodate very young birds of baby chick or starter size to grower, and larger birds of mature layer size.

Another object of this invention is to provide a cage floor construction which is adaptable to function as an upwardly inclined ramp upon which young bird occupants of the cage may ascend to a trough for feed.

A further object of this invention is to provide a cage arrangement which may be extended in size to accommodate relatively large size birds to avoid crowding them by extending a section of the floor to a lower position.

Still another object of this invention is to provide a floor construction which is adaptable to function as a downwardly inclined ramp upon which eggs laid by hen occupants may freely gravitate to a collection area.

Moreover, it is an object of this invention to provide an adjustable floor construction including an egg collecting tray which also functions as part of a locking device for the adjustable floor section.

BRIEF DESCRIPTION OF THE DRAWINGS

In the accompanying drawings, wherein there is illustrated one complete embodiment of a preferred form of the invention, and wherein the same reference numerals designate the same parts in all of the views:

FIG. 1 shows an end elevational view of the cage arrangement according to this invention with portions broken away to illustrate details of the adjustable floor functioning as a ramp for baby chicks; and FIG. 2 shows an end elevational view of the cage arrangement of FIG. 1 with portions broken away to illustrate details of the adjustable floor extended to accommodate mature size birds and to serve as a roll-away ramp for eggs laid by hen occupants of the cage.

DESCRIPTION OF THE PREFERRED EMBODIMENT

Referring now more particularly to the drawings, the cage arrangement generally designated C may be adapted to accommodate housing requirements of very small birds such as baby chicks B as shown in FIG. 1 to housing requirements of mature full grown birds such as the laying hen H shown in FIG. 2. As illustrated, the cage C is of standard wire construction and comprises a rear floor section 10, which is integrally formed with a rear wall 12 and side walls 13 (only one of which is shown). Rear floor section 10, which is fixed, is formed with a network of wires including a plurality of longitudinally extending members 11, the forward-most one of which serves as a pivot point for an adjustable front floor or ramp section 14. The adjustable floor section 14 is pivotally secured to fixed floor section 10 by means of a plurality of longitudinally spaced loop elements 16 each of which encircles the forward-most wire member 11 of fixed floor section 10 and one of the wire members 15 of adjustable floor section 14 slightly forward of the rear edge thereof. Adjustably secured adjacent the front edge of floor section 14 is a ramp supporting section 18. Support section 18 comprises a plurality of longitudinally extending wires 19 and is adjustably hinged to adjustable section 14 by a plurality of longitudinally spaced loop elements 22 encircling a rearward-most wire member 19 of supporting section 18 and a wire member 15 of adjustable floor section 14 somewhat to the rear of the forward edge thereof. The forward portion of support ramp 18 is formed in the shape of a tray 20 into which eggs E may freely gravitate. A plurality of fixed longitudinally spaced support brackets 24 are positioned adjacent the lower front edge of the cage C. Each support bracket 24 comprises a generally vertically extending lock lug 26 and a tray supporting edge 28. Each lock lug 26 is adapted to be interposed between a pair of longitudinally extending wire members 19 of the ramp supporting section 18 to lock adjustable floor section 14 in either its upwardly inclined or its downwardly inclined position. As best seen seen in FIG. 2, adjustable floor section 14 in its downwardly inclined position is hingedly connected to the underside of fixed floor section 10 in overlapping relationship therewith. Similarly, ramp supporting section 18 is hingedly connected to adjustable floor section 14 on the underside thereof in overlapping relationship therewith.

At the lower portion of a forward wall 29 feed 30 is provided in a trough 32 secured thereto. Extending downwardly and to the rear from the front side of the trough 30 is a guard element 34.

Cage C thus may be used to accommodate the housing requirements of baby chicks B as shown in FIG. 1 with adjustable floor sections 14 selectively adjusted to the upwardly inclined ramp position. To secure adjustable floor section 14 in this position, ramp support section 18 is swung to approximately 90° with respect to adjustable section 14 and lowered over bracket 24 with the lock lugs passing between the two forward-most longitudinally extending wire members 19 at the front edge of trough 20. Thus any weight imposed upon adjustable floor section 14 by the chicks B would tend to be resolved along ramp supporting section 18 and ultimately directed against lock lugs 26, which retain adjustable section 14 and ramp supporting section 18 in the selected position. Thus baby chicks B may ascend adjustable floor section 14 serving as a ramp and avail themselves of the feed 30 provided in trough 32.

Alternatively, adjustable floor section 14 may be optionally swung from the position shown in FIG. 1 by raising the front edge of egg tray 20 out of engagement with lock lugs 26 to the position shown in FIG. 2. Adjustable floor section 14 may then be swung downwardly in the direction of the dotted arrow, past the lower portion of guard 34 so that the forward and rear edges of adjustable floor section 14 assume stabilizing, overlapping relationships with ramp supporting section 18 and rear floor section 10, respectively. With tray 20 lowered onto bracket support edges 28 and lug 26 passing between a pair of the longitudinally extending wire members 19 as shown in FIG. 2, the adjustable floor section is securely locked. To facilitate hinging of the forward edge of adjustable floor section 14 past guard 34 floor section 14 may be made of resilient spring material so that it may be deflected as it passes guard 34. Alternatively, the forward edge of adjustable floor section 14 may terminate short of the length shown in FIGS. 1 and 2 so that it may freely swing clear of guard 34. In this case a somewhat wider feed trough 32 may be provided to preclude an excessive gap between the front edge of the adjustable floor section 14 and the rear edge of the trough 32. As shown in FIG. 2, any weight imposed upon the adjustable floor section 14 by the occupants of cage C would ultimately be transmitted to lock lug 26 interposed between a pair of longitudinally extending wires 19 of ramp supporting section 18 and the tray extension 20 thereof. As shown in FIG. 2, in the extended or lowered position of floor section 14, adjustable floor section 14 and ramp supporting section 18 are each generally parallel to a fixed floor section 10 which extends forwardly from rear wall 12 to facilitate or roll-away of any eggs laid by occupants H of the cage C to collecting tray 20.

It is to be understood that while one preferred embodiment of the present invention has been illustrated and described herein, numerous variations or modifications herein may occur to those having skill in this art and what is intended to be covered herein is not only the illustrated form of the invention, but also any and all modified forms thereof as may come within the spirit of this invention.

I claim:

1. In a cage arrangement for selectively confining either very young animals or fully mature animals, in particular animals such as day old chicks to fully mature sized birds such as egg laying hens, for example, an adjustable flooring construction comprising: a fixed floor section extending from a rear wall to a forward edge and a movable section adjustably secured to the forward edge of said fixed section, said movable section being selectively adjustable to an upwardly inclined position to accommodate relatively young birds confined in said cage and to a downwardly inclined position to accommodate relatively mature birds.

2. The cage construction according to claim 1 wherein said movable section is hingedly secured to the forward edge of said fixed section.

3. In a cage arrangement for selectively confining either very young animals or fully mature animals, in particularly animals such as day old chicks to fully mature sized birds such as egg laying hens, for example, an adjustable flooring construction comprising: a fixed floor section extending from a rear wall to a forward edge and a movable section adjustably secured to the forward edge of said fixed section, said movable section being selectively adjustable to an up position to accommodate relatively young birds confined in said cage and to a down position to accommodate relatively mature birds, said movable section is hingedly secured to the forward edge of said fixed section and includes a rear edge which is adapted to extend in overlapping relationship under the forward edge of said fixed section when said movable section is lowered to its down position to accommodate relatively mature birds.

4. A cage construction according to claim 3 wherein said movable section has an egg tray adjustably secured thereto adjacent its forward edge.

5. The cage construction according to claim 4 wherein said egg tray comprises a rear edge which is adapted to extend in overlapping relationship under the forward edge of said movable section when said movable section is lowered to its down position to accommodate relatively mature birds.

6. The cage construction according to claim 5 wherein said egg tray is hingedly secured to said movable section.

7. The cage construction according to claim 6 in combination with locking means for selectively retaining said movable section in either its up or its down position.

8. The cage construction according to claim 7 wherein said locking means comprises fixed bracket means including a support portion upon which a portion at least of said egg tray is supported in the up or down position of said movable section and an upwardly projecting lug for locking said movable section and said egg tray in a given position.

9. The cage construction according to claim 8 wherein said lug passes through the bottom of said egg tray and precludes collapsing movement of said movable section of an egg tray in abutting relationship against at least one longitudinally extending wire forming a part of the egg tray.

10. The cage construction according to claim 9 wherein said movable section is adjustable to an upwardly inclined ramp position on which relatively young chicks may ascend and avail themselves to feed in a trough.

11. The cage construction according to claim 9 wherein said movable section and said egg tray in the down position thereof extend downwardly at a relatively slight grade along with said fixed section all at substantially the same angle with the horizontal to facilitate gentle gravitation of eggs from said floor sections into said tray.

* * * * *